United States Patent [19]

Shia

[11] Patent Number: 5,421,649
[45] Date of Patent: Jun. 6, 1995

[54] DRAWING MEANS OF MOVABLE BASE BOARD FOR OPTICAL SCANNER

[75] Inventor: Ting Shia, Hsinchu, Taiwan, Prov. of China

[73] Assignee: Umax Data Systems Inc., Hsinchu, Taiwan, Prov. of China

[21] Appl. No.: 281,401

[22] Filed: Jul. 26, 1994

[51] Int. Cl.6 ............................................. A47B 95/02
[52] U.S. Cl. ................................. 312/348.6; 16/124; 403/330; 403/386; 312/330.1
[58] Field of Search ................. 312/330.1, 244, 334.7, 312/348.6; 403/330, 386; 16/124

[56] References Cited

U.S. PATENT DOCUMENTS

| | | | |
|---|---|---|---|
| 1,222,451 | 4/1917 | Ohnstrand | 312/330.1 |
| 1,569,094 | 1/1926 | Kurtzon | 312/348.6 |
| 3,680,177 | 8/1972 | Ginsberg | 312/330.1 |
| 4,744,126 | 5/1988 | Bisbing | 16/124 X |
| 5,074,009 | 12/1991 | Simonton et al. | 312/348.6 |

Primary Examiner—Kenneth J. Dorner
Assistant Examiner—Anthony Barfield
Attorney, Agent, or Firm—W. Wayne Liauh

[57] ABSTRACT

A movable base board for an optical scanner includes a handle being disposed on a rectangular opening formed on the bottom of the movable base board. A concave recess is formed on the handle for hand grasping. The handle is fixed on the movable base board by means of latch studs and snap pin engaging with openings formed on the movable base board.

1 Claim, 5 Drawing Sheets

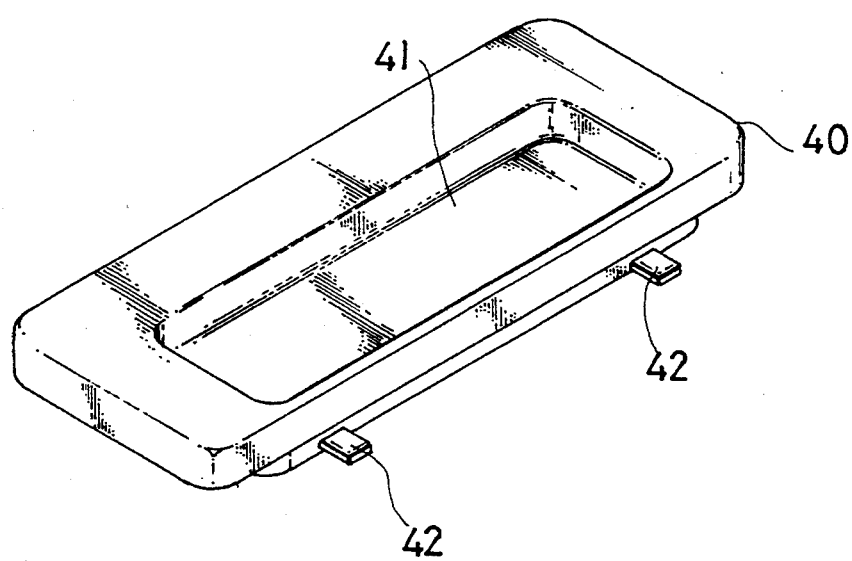
F I G.5
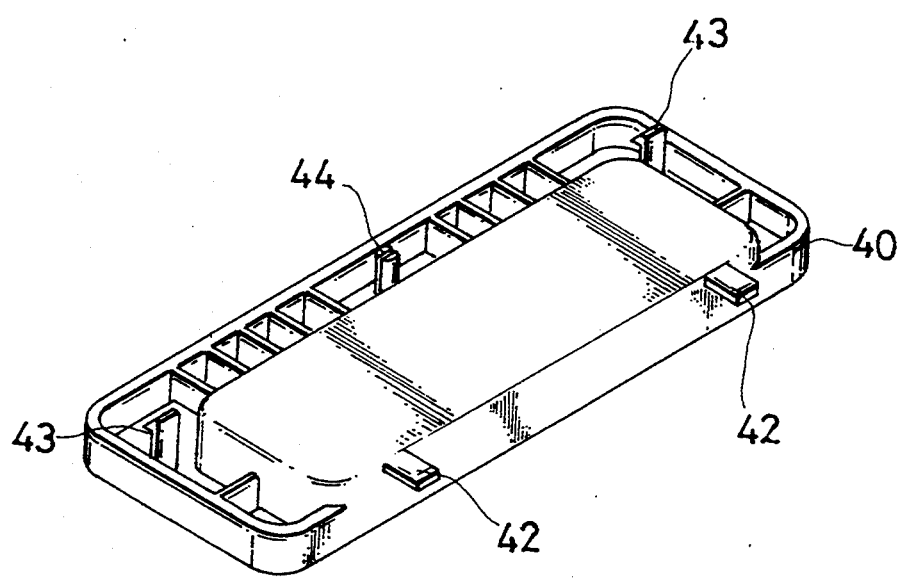
F I G.6

DRAWING MEANS OF MOVABLE BASE BOARD FOR OPTICAL SCANNER

BACKGROUND

Optical scanner is widely used as an input device for documents, graphics and images in the office automation environment. It could become even more popular once the optical character recognition (OCR) technology being included. Conventional optical scanner is generally formed in a rectangular body (referring to FIG. 1), including mainly an upper case (11), a supporting frame (12) and a base (13). A cover board (14) is disposed above upper case (11), upper case (11) is screwed with supporting frame (12) which is further screwed with base (13) to form the main structure of a scanner. Scanning head (120) captures the digital signals of the scanning documents and transmits to main circuit board (130) for data processing and input output function. Main circuit board (130) is located below scanning head (120) and is disposed inside of base (13)

The structure of conventional optical scanner set forth above has drawbacks in actual utilization. The tightly screwing among the main components making repairs and maintenance difficult and time-consuming as it usually takes three or four dismantling steps to separate the key components. The repetitive separation and assembly tend to damage parts and their reliability. The scanning head also tends to expose to outside dusts and dirts, and impair its effective life.

There are some structural improvement to address the issue set forth above as illustrating in FIG. 2. Main circuit board (21) is disposed on a movable base board (20) which can be drawn out from under base frame (30), movable base board (20) is mounting and moving along a pair of guiding rail (31) which is fixed on base frame (30). Power supply circuit board (22) is disposed on one side of movable base board (20). The repairs and maintenance of circuits can be easily done without dismantling the main structural components. In the mean time the semi-opening design of movable board allows heat dissipating more effectively.

Although movable base board have advantages described above, it is located under the bottom of a scanner, and make repairs and maintenance awkward when no drawing means being provided.

SUMMARY OF THE INVENTION

It is accordingly an object of the present invention to provide a drawing means of movable base board for optical scanner to facilitate repairs and maintenance.

The present invention particularly contemplates to employ a handle with a concave recess to dispose under the bottom of movable base board to achieve the object set forth above.

It is another object of the present invention to provide a drawing means with compatible appearance on a movable base board.

Additional objects and advantages of the present invention are made apparent in the following description having reference to the accompanying drawings. The accompanied drawings are only to serve for reference and illustrative purpose, and do not intend to limit the scope of the present invention.

BRIEF DESCRIPTION OF THE DRAWINGS

FIG. 5 is a top perspective view of a handle of the present invention.

FIG. 6 is a bottom perspective view of a handle of the present invention.

DESCRIPTION OF THE PREFERRED EMBODIMENTS

Figure 1:
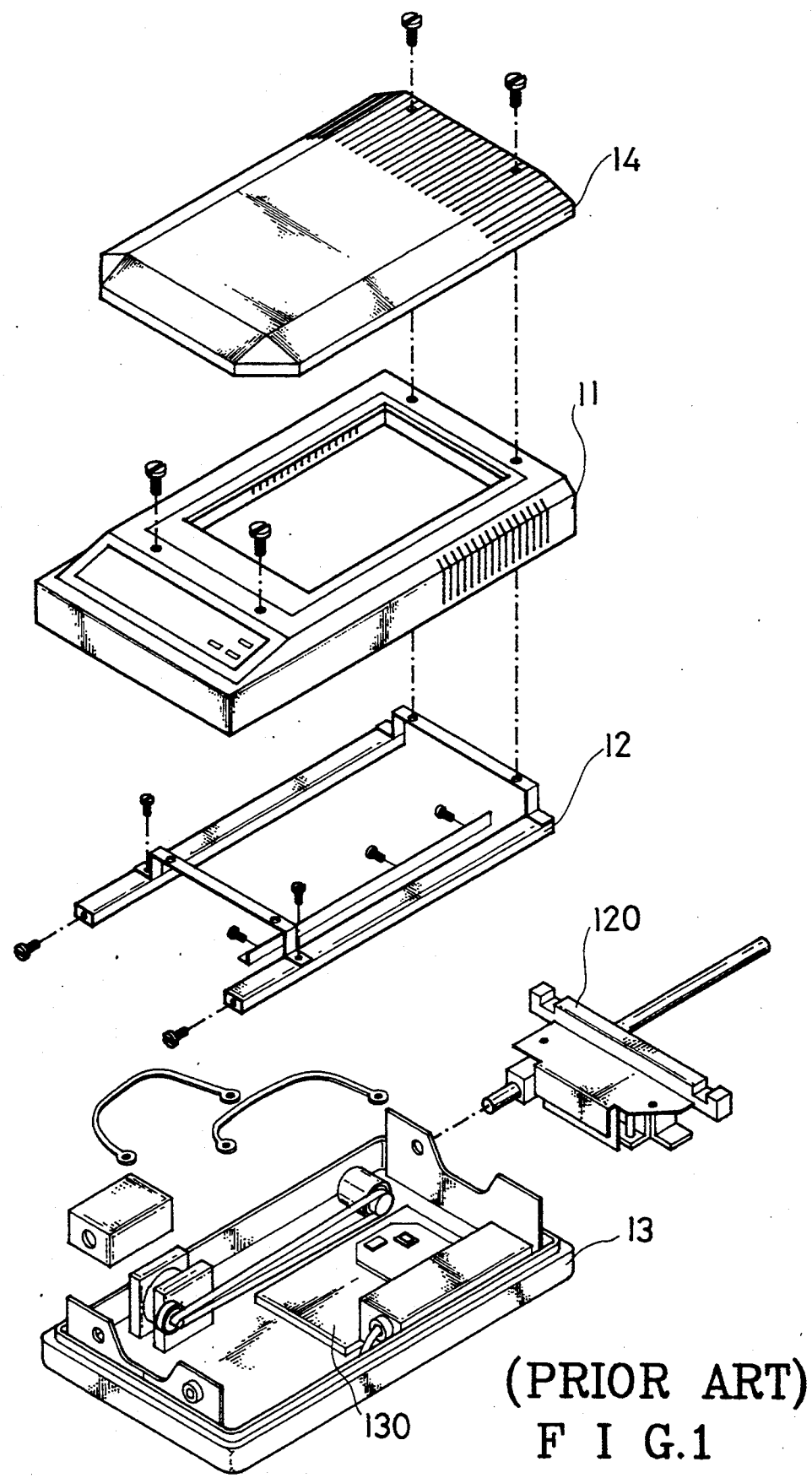
FIG. 1 is a break up view of a conventional optical scanner.
Figure 2:
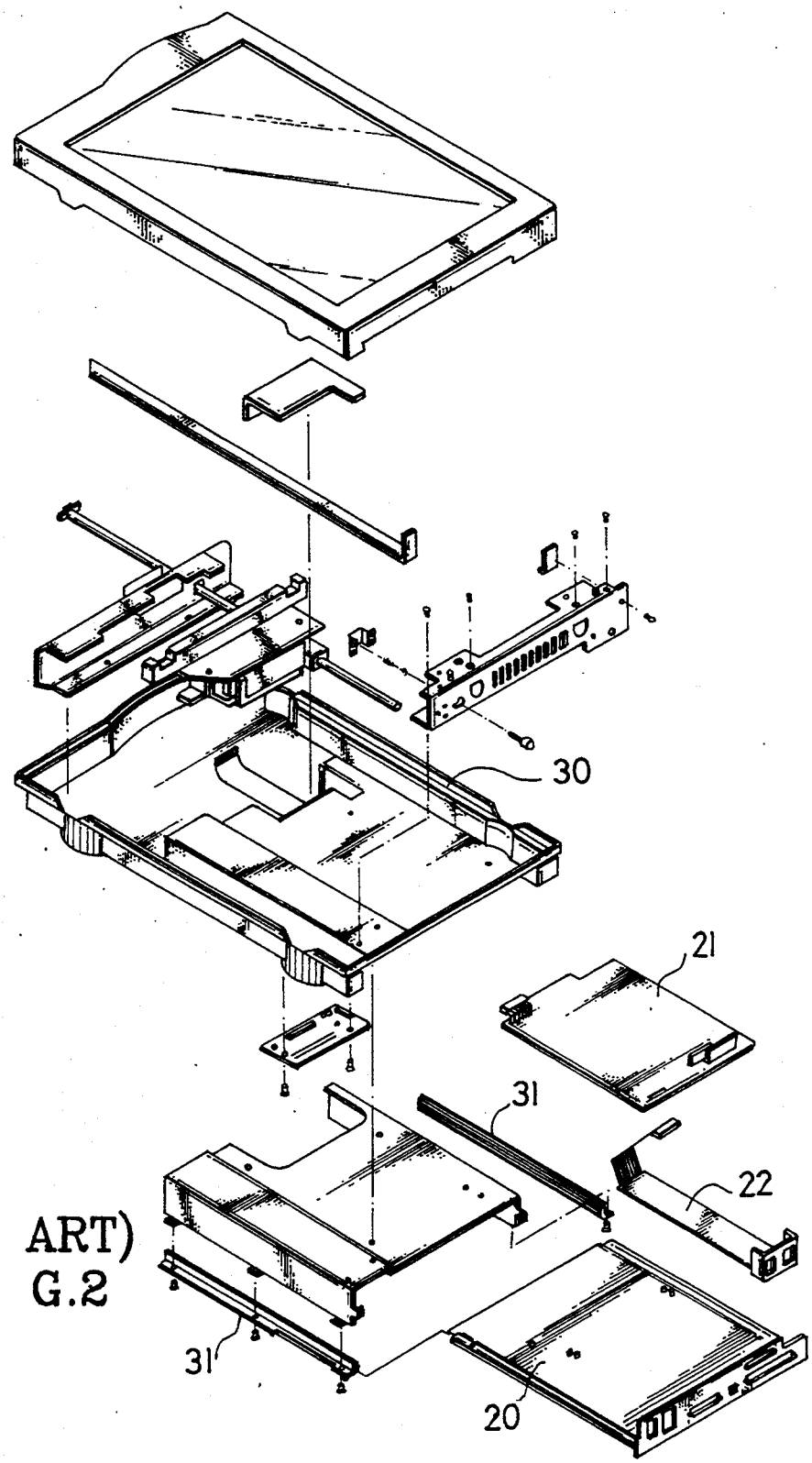
FIG. 2 is a break up view of an optical scanner including a movable base board.
Figure 3:
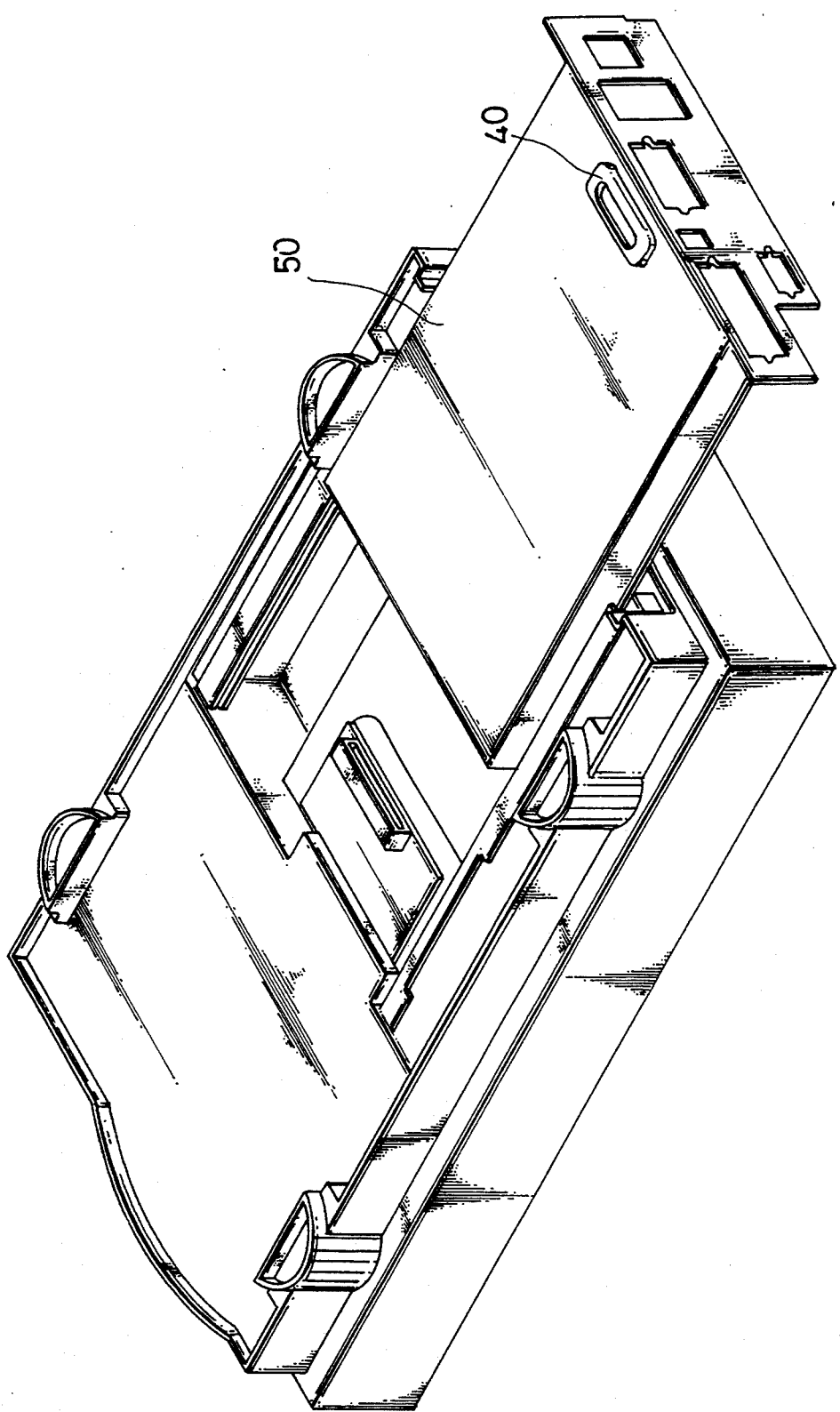
FIG. 3 is a pictorial view of the present invention being disposed under a movable base board.
Figure 4:
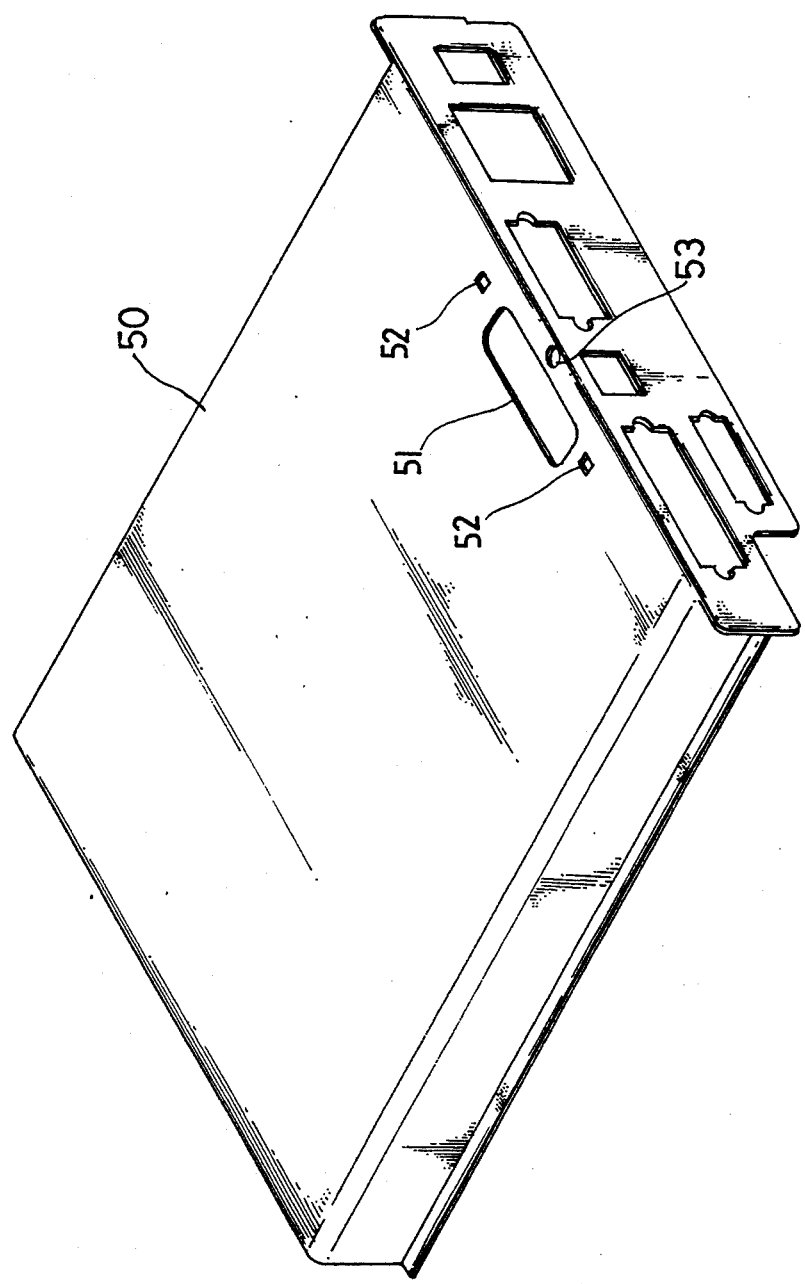
FIG. 4 is a perspective view of a movable base board of the present invention.

Referring to FIG. 3 and 4, a drawing means of the present invention is disposed at a rear end under the bottom of a movable base board (50), including a handle (40) whereby to draw movable base board (50) out from scanner base frame. Movable base board (50) has a rectangular opening (51) formed at a one end, and has two small square openings (52) formed respectively at each lateral side of opening (51), and has a small circular opening (53) formed at another side of rectangular opening (51).

Referring to FIG. 5 and 6, handle (40) has a concave recess (41) for hand grasping. There are two protrudent studs (42) disposed on a bottom side. Under the bottom of handle (40), there are two latch studs (43) and one circular snap pin (44) being disposed.

Handle (40) is disposed on rectangular opening (51), protrudent studs (42) are disposed under bottom of movable base board (30), latch stud (43) fits into a square opening (52), and circular snap pin (44) fits into the circular opening (53).

It thus provides a simple and effective drawing means to move the movable base board into or out of base frame of the scanner.

It is to be understood that the descriptions and preferred embodiments set forth above are only to serve for illustrative purpose, and do not intent to limit the scope of the present invention. Various changes and modifications may be made without departing from the scope of the present invention. Accordingly, the specific scope of the present invention is defined only by the following claims which are further exemplary of the present invention.

What is claimed is:

1. A movable base board for optical scanner with a handle being disposed on said movable base board, characterized in that said movable base board having a rectangular opening, a small square opening at each of two lateral sides of the rectangular opening and a small circular opening on another side of the rectangular opening; the handle having a concave recess for hand grasping, having two protrudent studs on one lateral side to be disposed under bottom of said movable base board, having two latch studs to engage with the rectangular opening and having a circular snap pin to engage with the circular opening.

* * * * *